United States Patent [19]

Cavalli

[11] Patent Number: 4,497,243
[45] Date of Patent: Feb. 5, 1985

[54] PERCOLATOR ASSEMBLY SUPPORTING STRUCTURE, PARTICULARLY FOR DOMESTIC AUTOMATIC COFFEE PERCOLATORS

[76] Inventor: Alfredo Cavalli, Via Galilei, 9, 20060 Pessano Con Bornago (Milano), Italy

[21] Appl. No.: 499,826

[22] Filed: Jun. 1, 1983

[30] Foreign Application Priority Data

Jun. 11, 1982 [IT] Italy .................. 21827 A/82

[51] Int. Cl.³ .............................................. A47J 31/14
[52] U.S. Cl. ........................................ 99/323; 99/295; 210/407; 210/481
[58] Field of Search ............ 99/295, 306, 289 R, 99/289 P, 289 D, 287, 297, 323; 206/45.16, 0.5; 220/93; 222/306; 425/187, 221, 276; 426/77, 433; 210/282, 314, 407, 481

[56] References Cited

U.S. PATENT DOCUMENTS

| 161,640 | 4/1875 | Smith | 99/297 |
| 3,103,873 | 9/1963 | Breitenstein | 99/289 |
| 3,369,478 | 2/1968 | Black | 99/289 |
| 3,660,117 | 5/1972 | Neely | 99/289 |

FOREIGN PATENT DOCUMENTS 1082412  6/1954  France .................. 99/289 RPB

Primary Examiner—Robert W. Jenkins
Attorney, Agent, or Firm—Bucknam and Archer

[57] ABSTRACT

The percolator supporting structure comprises a coffee powder containing body (1) effective to be coupled to the water dispensing unit and provided, at the bottom thereof, with coffee metering spouts, and including a coffee powder holding grille (5) movable therein and effective to be located at a plurality of different levels, in such a way as to vary the coffee powder containing capacity of the body (1) and facilitate the removing of the spent coffee powder.

2 Claims, 5 Drawing Figures

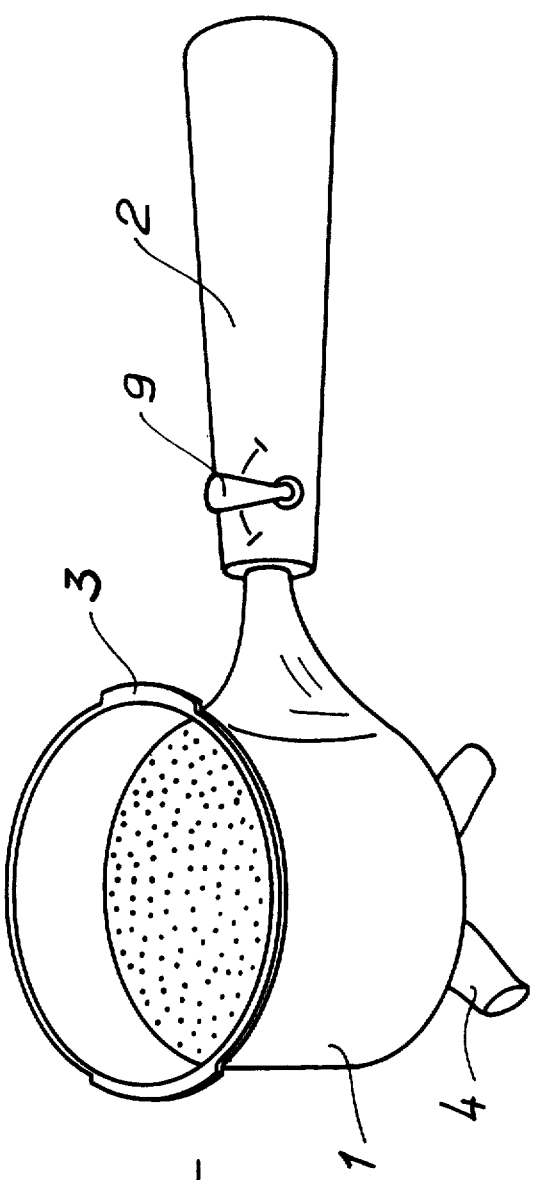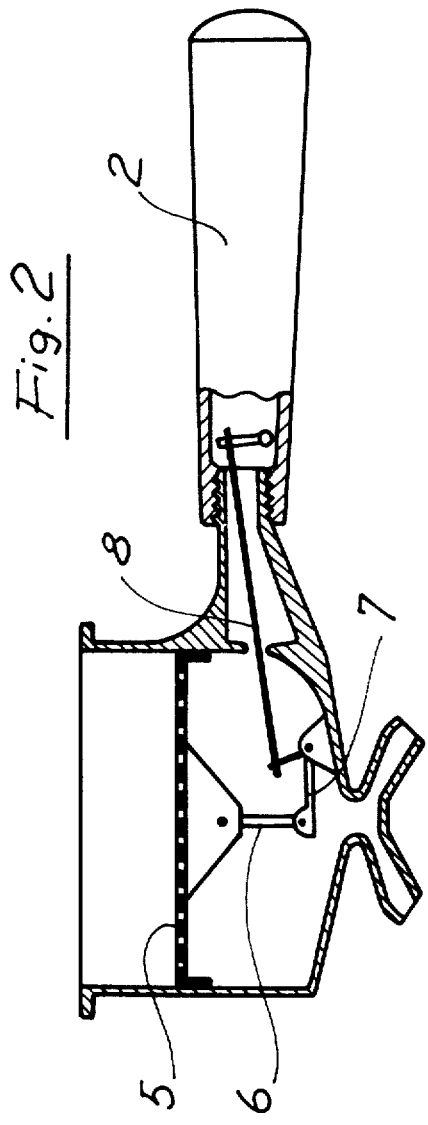

PERCOLATOR ASSEMBLY SUPPORTING STRUCTURE, PARTICULARLY FOR DOMESTIC AUTOMATIC COFFEE PERCOLATORS

The present invention relates to a percolator assembly bearing or supporting structure, specifically designed for automatic coffee percolators for home use.

As it is well known, the domestic automatic coffee percolators are provided with a percolator assembly holder, which comprises a vessel member, having a gripping handle, in the inside thereof it is possible to house the percolator cups.

Moreover the mentioned automatic coffee percolators are provided with a percolator for preparing two coffee cups and a percolator for preparing a single coffee cup, thereby the user is compelled to introduce into the machine the percolator suitable for the number of coffee cups to be made.

That requirement, while being a simple operation, is however a rather tedious task, particularly in those cases therein a plurality of coffee cups are to be prepared, owing to the fact that the percolators are heated, thereby the removing thereof from the vessel may be difficult.

Another drawback of the presently available solutions is that the coffee powder, being suitably pressed, may be hardly removed from the percolator body, with tedious manual operations.

Accordingly, the task of the present invention is to overcome the thereinabove mentioned drawbacks, by providing such a new percolator assembly supporting structure, particularly for automatic coffee percolators, which, while being effective to eliminate said drawbacks, affords the possibility of preparing either one or two or more coffee cups, without the need of replacing the percolator member.

Within that task, it is a main object of the present invention to provide such a percolator assembly supporting structure affording the possibility of completely removing the used coffee powder, without the need of carrying out tedious and difficult cleaning operations.

Yet another object of the present invention is to provide such a percolator assembly supporting structure which, while having greatly improved characteristics with respect to the known prior art, is of such a size and shape substantially equal to the conventional ones, thereby it may be fitted to the existing automatic coffee percolators for home use.

According to one aspect of the present invention, the thereinabove mentioned task and objects, as well as yet other objects, which will become more apparent thereinafter, are achieved by a percolator assembly supporting structure, particularly for domestic automatic coffee percolators, comprising a coffee powder containing body, effective to be coupled to the water dispensing unit and provided, at the bottom thereof, with coffee metering spouts, characterized in that said containing body includes a coffee powder containing grille movable in said body and effective to be located at different levels herein in such a way as to vary the capacity of said body and facilitate the removing of the spent coffee powder.

Further characteristics and advantages of the invention will become more apparent thereinafter from the following detailed description of a preferred though not exclusive embodiment of a percolator assembly supporting structure, particularly for automatic coffee percolators, for home use, according to the present invention, being illustrated by way of a not limitative example in the accompanying drawings, where:

FIG. 1 is a schematic perspective view illustrating the percolator assembly structure according to the present invention;

FIG. 2 is a schematic partially broken away view illustrating the percolator assembly and the coffee powder containing or holding grille as arranged for dispensing a single coffee cup;

Figure 3:
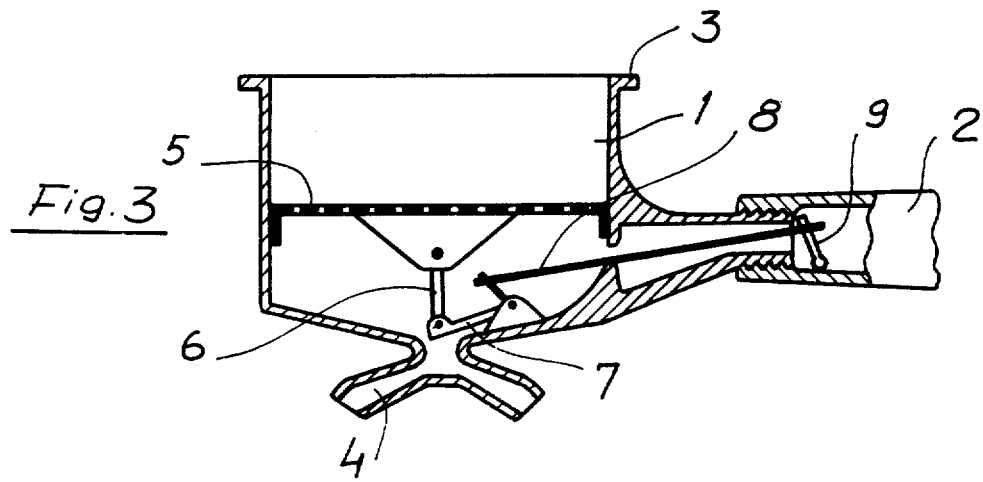
FIG. 3 is a partially cut away view, illustrating the mentioned grille as arranged for dispensing two coffee cups.
Figure 4:
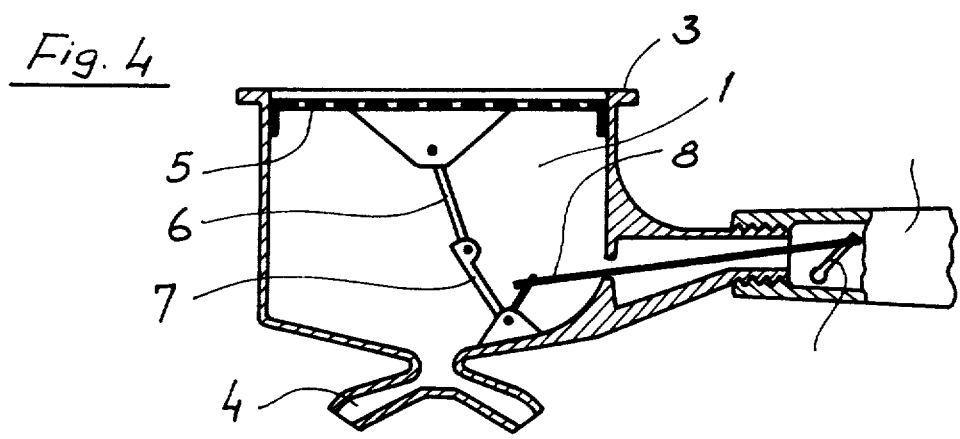
FIG. 4 illustrates the position assumed by the coffee powder holding grille in order to expel the spent coffee powder.
Figure 5:
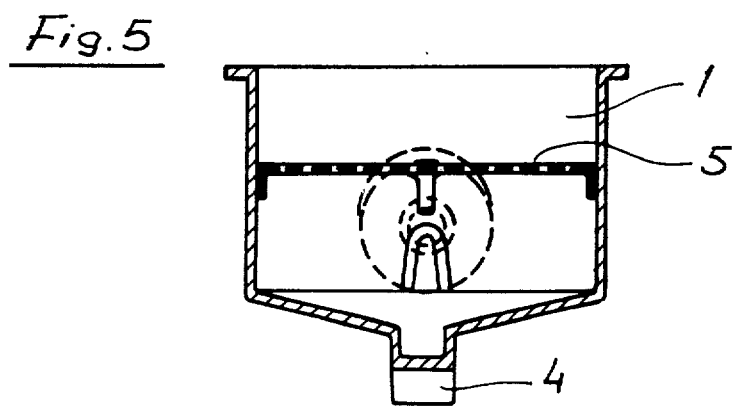
FIG. 5 is a cross-sectional side view illustrating the percolator assembly supporting structure.

With reference to the above mentioned figures, the percolator assembly supporting structure, particularly for domestic automatic coffee percolators, according to the present invention, comprises a containing body or vessel 1 which, as it is conventional, is provided with a handle member 2, radially extending from said body.

At the top thereof, the body 1 is provided with bayonet coupling members 3, for coupling said body to the water metering unit of a domestic automatic coffee percolator, whereas, at the bottom thereof, it is provided with a coffee dispensing spout pair, indicated at 4.

A main feature of the present invention is that, inside the mentioned containing body or vessel 1, there is provided a grille 5, effective to contain or hold the coffee powder, which grille may be displaced inside said body and located and locked at different levels therein, in such a way as to practically vary the coffee containing capacity of said body and afford the possibility of easily removing the spent coffee powder therefrom.

According to a preferred embodiment, which is illustrated in the accompanying drawings, the grille 5 is coupled, at the bottom thereof, to a rod member 6, in turn hinged on a rocker member 7, which latter is coupled to the inside of the body 1 and driven by a link 8, the operating lever 9 thereof is pivotally coupled to the handle 2 and may be locked at a plurality of desired positions by known means, not specifically shown, such as notches and the like formed on the handle and cooperating with detent means formed on the lever.

In this embodiment, the lever 9 may be operated in such a way as to locate the grille 5 at a first position, therein the capacity of the body 1 corresponds to two coffee cups, at a second position, therein the capacity of the containing body or vessel 1 corresponds to a single coffee cup, and at a third position, therein the grille 5 is substantially flush with respect to the body 1 edge, in order to facilitate the removing of the spent coffee powder.

Thus, in the disclosed embodiment, three positions may be assumed by the grille 5.

It should be noted in that as aforesaid connection that the lever 9, instead of having locking positions at the single mentioned positions of the grille 5, may be locked in several positions thereof or it may be so designed as to allow for the grille 5 to be arranged at any suitable positions, thereby providing the user with the possibility of varying, in a discrete manner, and depending on his/her requirements, the location of the grille 5.

Thus, the means for varying the location of the grille 5 inside the body 1 may be selected in a very broad range, without departing from the inventive idea of having a movable grille in the inside of the containing body 1, in such a way as to vary the coffee powder containing capacity of the latter, without the need of replacing any percolators, as in the prior art approaches.

Moreover, though the lever 9 has been shown as arranged on the handle 2 of the percolator assembly supporting structure, it should be apparent that the driving or operating member may be located at any suitable positions, without departing from the scope of the invention.

From the above disclosure it should be noted that the invention fully achieves the intended task and objects.

In particular, the fact should be pointed out that the provision of a coffee powder holding grille, which is movable in the inside of the body or vessel 1, affords the possibility of having a greatly flexible and practical percolator supporting structure, and, moreover, or easily expelling the spent coffee powder.

Furthermore, another main feature of the invention, is that it provides the user with the possibility of adjusting at will the coffee powder capacity of the percolator assembly and, accordingly, of varying the coffee dose to be introduced.

The invention, as it has been thereinabove disclosed, is susceptible to several modifications and variations, all thereof fall within the scope of the invention itself.

Moreover all of the constructional details may be replaced by other technically equivalent elements.

In practicing the invention the used materials, as well as the contingent size and shapes may be any according to the requirements.

I claim:

1. A percolator assembly supporting structure particularly for domestic automatic coffee percolators, comprising a powder containing body effective to be coupled to the water dispensing unit and provided, at the bottom thereof, with coffee metering spouts, in said containing body a coffee powder holding grille being slidably housed, characterized in that said structure further comprises driving means which may be operated from the outside of said structure for moving said holding grille to at least a first position therein it defines in said body a first space effective to receive a coffee powder amount sufficient for preparing two coffee cups, a second position therein it defines in said body a second space effective to receive a coffee powder amount sufficient for preparing a single coffee cup, as well as a third position position therein said holding grill is substantially located flush with the upper edge of said body, locking means being moreover provided for locking said grille in each said position thereof.

2. A structure according to claim 1, characterized in that said driving means consist of a rod member articulated to said holding grille and to a rocker lever which latter is articulated, at a middle portion thereof, to said containing body and, at the other end thereof, to a link coupled to an operating lever pivotally coupled on a handle associated with said body.

* * * * *